(12) United States Patent
Kim et al.

(10) Patent No.: US 11,479,721 B2
(45) Date of Patent: Oct. 25, 2022

(54) LIQUID CRYSTAL COMPOSITION AND DISPLAY DEVICE INCLUDING THE SAME

(71) Applicant: Samsung Display Co., Ltd., Yongin-Si (KR)

(72) Inventors: Kyung Min Kim, Seoul (KR); Sung Jae Yun, Hwaseong-si (KR); Kang Seob Jeong, Hwaseong-si (KR); Jin Suek Kim, Suwon-si (KR); Heung Shik Park, Seoul (KR)

(73) Assignee: Samsung Display Co., Ltd.

( * ) Notice: Subject to any disclaimer, the term of this patent is extended or adjusted under 35 U.S.C. 154(b) by 135 days.

(21) Appl. No.: 17/017,601

(22) Filed: Sep. 10, 2020

(65) Prior Publication Data

US 2021/0261863 A1 Aug. 26, 2021

(30) Foreign Application Priority Data

Feb. 21, 2020 (KR) .................. 10-2020-0021476

(51) Int. Cl.
| | |
|---|---|
| *G02F 1/1333* | (2006.01) |
| *C09K 19/30* | (2006.01) |
| *G02F 1/1334* | (2006.01) |
| *G02F 1/137* | (2006.01) |
| *C09K 19/04* | (2006.01) |
| *G09G 3/36* | (2006.01) |

(52) U.S. Cl.
CPC .......... *C09K 19/3003* (2013.01); *G02F 1/137* (2013.01); *G02F 1/1334* (2013.01); *C09K 2019/0448* (2013.01); *C09K 2019/301* (2013.01); *C09K 2019/3004* (2013.01); *C09K 2019/3009* (2013.01); *C09K 2019/3016* (2013.01); *G02F 1/13712* (2021.01); *G09G 3/3607* (2013.01); *G09G 3/3614* (2013.01); *G09G 3/3677* (2013.01); *G09G 3/3688* (2013.01); *G09G 2310/08* (2013.01); *G09G 2320/10* (2013.01)

(58) Field of Classification Search
CPC ................ C09K 19/3003; C09K 19/12; C09K 2019/0448; C09K 2019/3004; C09K 2019/3009; C09K 2019/301; C09K 2019/3016; C09K 2019/122; C09K 2019/3027; G02F 1/1334; G02F 1/137; G02F 1/13712; G02F 1/1333
See application file for complete search history.

(56) References Cited

U.S. PATENT DOCUMENTS

| | | | |
|---|---|---|---|
| 8,361,570 B2 | 1/2013 | Usui et al. | |
| 2019/0241809 A1* | 8/2019 | Klasen-Memmer | ........................ C09K 19/3003 |
| 2019/0300791 A1* | 10/2019 | Kirsch | ............... C09K 19/3098 |
| 2021/0261863 A1* | 8/2021 | Kim | ........................ G02F 1/137 |

FOREIGN PATENT DOCUMENTS

| | | |
|---|---|---|
| JP | 2015-513577 A | 5/2015 |
| JP | 6094855 B2 | 3/2017 |
| JP | 6565648 B2 | 8/2019 |
| KR | 10-2018-0083850 A | 7/2018 |

* cited by examiner

*Primary Examiner* — Geraldina Visconti
(74) *Attorney, Agent, or Firm* — Innovation Counsel LLP

(57) ABSTRACT

A liquid crystal composition includes the following compounds: (in a range of 21.5 to 26.5 parts by weight) a compound represented by a first chemical formula, (in a range of 2.5 to 7.5 parts by weight) a compound represented by a second chemical formula, (in a range of 12.5 to 17.5 parts by weight) a compound represented by a third chemical formula, (in a range of 5.5 to 10.5 parts by weight) a compound represented by a fourth chemical formula, (in a range of 7.5 to 12.5 parts by weight) a compound represented by a fifth chemical formula, (in a range of 2 to 7 parts by weight) a compound represented by a sixth chemical formula, (in a range of 10.5 to 15.5 parts by weight) a compound represented by a seventh chemical formula, and (in a range of 13 to 18 parts by weight) an compound represented by an eighth chemical formula 8.

20 Claims, 12 Drawing Sheets

LIQUID CRYSTAL COMPOSITION AND DISPLAY DEVICE INCLUDING THE SAME

CROSS-REFERENCE TO RELATED APPLICATION

This application claims priority to and benefit of Korean Patent Application No. 10-2020-0021476, filed on Feb. 21, 2020, in the Korean Intellectual Property Office; the Korean Patent Application is incorporated by reference.

BACKGROUND

1. Technical Field

The technical field relates to a liquid crystal composition and a display device including the liquid crystal composition.

2. Description of the Related Art

A liquid crystal display (LCD) device typically includes field-generating electrodes (such as pixel electrodes and a common electrode) and a liquid crystal layer. The LCD device forms an electric field in the liquid crystal layer by applying a voltage to the field-generating electrodes, so as to control orientations of liquid crystal molecules in the liquid crystal layer, for controlling light transmitted through the liquid crystal layer, thereby displaying an image.

SUMMARY

Embodiments may be related a liquid crystal composition for attaining satisfactory transmittance of a liquid crystal layer. Embodiments may be related to a display device including the liquid crystal composition.

In an embodiment, satisfactory transmittance of a display device can be attained with a low refractive index anisotropy ($\Delta n$) and a low elastic modulus (K11).

According to an embodiment of the disclosure, a liquid crystal composition comprises based on 100 parts by weight of the entire liquid crystal composition, respectively, 21.5 to 26.5 parts by weight of the liquid crystal compound represented by Chemical Formula 1 below, 2.5 to 7.5 parts by weight of the liquid crystal compound represented by Chemical Formula 2 below, 12.5 to 17.5 parts by weight of the liquid crystal compound represented by Chemical Formula 3 below, 5.5 to 10.5 parts by weight of the liquid crystal compound represented by Chemical Formula 4 below, 7.5 to 12.5 parts by weight of the liquid crystal compound represented by Chemical Formula 5 below, 2 to 7 parts by weight of the liquid crystal compound represented by Chemical Formula 6 below, 10.5 to 15.5 parts by weight of the liquid crystal compound represented by Chemical Formula 7 below, and 13 to 18 parts by weight of the liquid crystal compound represented by Chemical Formula 8 below,

[Chemical Formula 1]

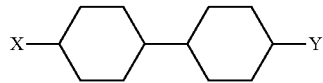

[Chemical Formula 2]

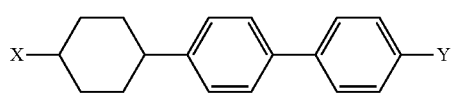

[Chemical Formula 3]

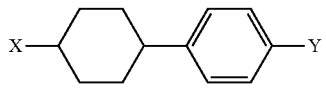

[Chemical Formula 4]

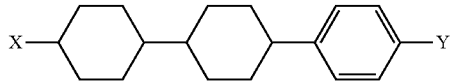

[Chemical Formula 5]

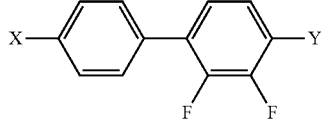

[Chemical Formula 6]

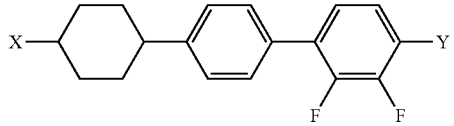

[Chemical Formula 7]

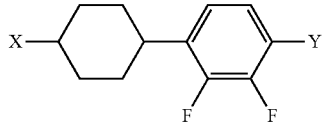

[Chemical Formula 8]

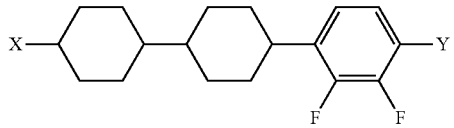

In Chemical Formulas 1 to 8, X and Y are each independently an alkenyl group or an alkyl group having 1 to 7 carbon atoms.

In an embodiment, the liquid crystal compound represented by Chemical Formula 1 includes a first liquid crystal compound in which X and Y are alkyl groups, and a second liquid crystal compound in which X is selected as an alkyl group or as an alkenyl group and Y is selected as the other.

In an embodiment, the content of the second liquid crystal compound is 18 to 36 parts by weight based on 100 parts by weight of the entire liquid crystal compound represented by Chemical Formula 1.

The liquid crystal composition further comprises a compound represented by Chemical Formula 9 below,

[Chemical Formula 9]

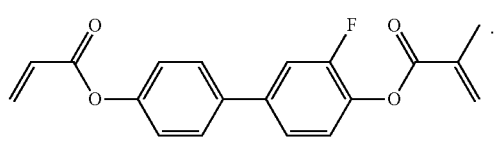

In an embodiment, the content of the compound represented by Chemical Formula 9 is 0.2 to 0.5 parts by weight based on 100 parts by weight of the entire liquid crystal composition.

In an embodiment, the liquid crystal composition has an elastic modulus (K33) of 15 pN to 18 pN, and satisfies Mathematical Expression 1 below,

[Mathematical Expression 1]

$$6 \leq \text{rotational viscosity}(\gamma 1)/\text{elastic modulus}(K33) \leq 7.2.$$ [Mathematical Expression 1]

In an embodiment, the liquid crystal composition has an elastic modulus (K11) of 12 pN to 15 pN.

In an embodiment, the liquid crystal composition has a refractive index anisotropy (Δn) of 0.100 to 0.104.

In an embodiment, the liquid crystal composition has a dielectric anisotropy (Δε) of −2.9 to −3.3.

According to an embodiment of disclosure, a display device comprises a first substrate including a pixel electrode, a second substrate including a common electrode; and a liquid crystal layer interposed between the first substrate and the second substrate, wherein the liquid crystal layer includes based on 100 parts by weight of the entire liquid crystal composition, respectively, 21.5 to 26.5 parts by weight of the liquid crystal compound represented by Chemical Formula 1 below, 2.5 to 7.5 parts by weight of the liquid crystal compound represented by Chemical Formula 2 below, 12.5 to 17.5 parts by weight of the liquid crystal compound represented by Chemical Formula 3 below, 5.5 to 10.5 parts by weight of the liquid crystal compound represented by Chemical Formula 4 below, 7.5 to 12.5 parts by weight of the liquid crystal compound represented by Chemical Formula 5 below, 2 to 7 parts by weight of the liquid crystal compound represented by Chemical Formula 6 below, 10.5 to 15.5 parts by weight of the liquid crystal compound represented by Chemical Formula 7 below, and 13 to 18 parts by weight of the liquid crystal compound represented by Chemical Formula 8 below,

[Chemical Formula 1]

[Chemical Formula 2]

[Chemical Formula 3]

[Chemical Formula 4]

[Chemical Formula 5]

[Chemical Formula 6]

[Chemical Formula 7]

[Chemical Formula 8]

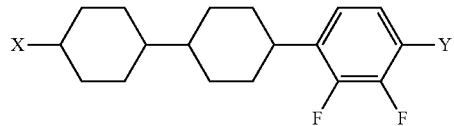

In Chemical Formulas 1 to 8, X and Y are each independently an alkenyl group or an alkyl group having 1 to 7 carbon atoms.

In an embodiment, the liquid crystal compound represented by Chemical Formula 1 includes a first liquid crystal compound in which X and Y are alkyl groups, and a second liquid crystal compound in which X is selected as an alkyl group or as an alkenyl group and Y is selected as the other.

In an embodiment, the content of the second liquid crystal compound is 18 to 36 parts by weight based on 100 parts by weight of the entire liquid crystal compound represented by Chemical Formula 1.

In an embodiment, the liquid crystal composition further includes a compound represented by Chemical Formula 9 below,

[Chemical Formula 9]

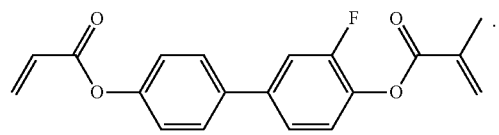

In an embodiment, the content of the compound represented by Chemical Formula 9 is 0.2 to 0.5 parts by weight based on 100 parts by weight of the entire liquid crystal composition.

In an embodiment, the display device has a phase difference of 310 nm to 340 nm.

In an embodiment, the liquid crystal composition has an elastic modulus (K33) of 15 pN to 18 pN, and satisfies Mathematical Expression 1 below, $$6 \leq \text{rotational viscosity}(\gamma 1)/\text{elastic modulus}(K33) \leq 7.2.$$ [Mathematical Expression 1]

In an embodiment, the liquid crystal composition has an elastic modulus (K11) of 12 pN to 15 pN.

In an embodiment, the liquid crystal composition has a refractive index anisotropy (Δn) of 0.100 to 0.104.

In an embodiment, the liquid crystal composition has a dielectric anisotropy (Δε) of −2.9 to −3.3.

In an embodiment, the liquid crystal layer includes liquid crystal aligned to have a pretilt angle through a polymer network composed of polymers of reactive mesogens represented by Chemical Formula 9. An embodiment may be related to a liquid crystal composition. The liquid crystal composition may include the following compounds: in a range of 21.5 to 26.5 parts by weight of the liquid crystal composition, a liquid crystal compound represented by Chemical Formula 1; in a range of 2.5 to 7.5 parts by weight of the liquid crystal composition, a liquid crystal compound represented by Chemical Formula 2; in a range of 12.5 to 17.5 parts by weight of the liquid crystal composition, a liquid crystal compound represented by Chemical Formula 3; in a range of 5.5 to 10.5 parts by weight of the liquid crystal composition, a liquid crystal compound represented by Chemical Formula 4; in a range of 7.5 to 12.5 parts by weight of the liquid crystal composition, a liquid crystal compound represented by Chemical Formula 5; in a range of 2 to 7 parts by weight of the liquid crystal composition, a liquid crystal compound represented by Chemical Formula 6; in a range of 10.5 to 15.5 parts by weight of the liquid crystal composition, a liquid crystal compound represented by Chemical Formula 7; and in a range of 13 to 18 parts by weight of the liquid crystal composition, an liquid crystal compound represented by Chemical Formula 8,

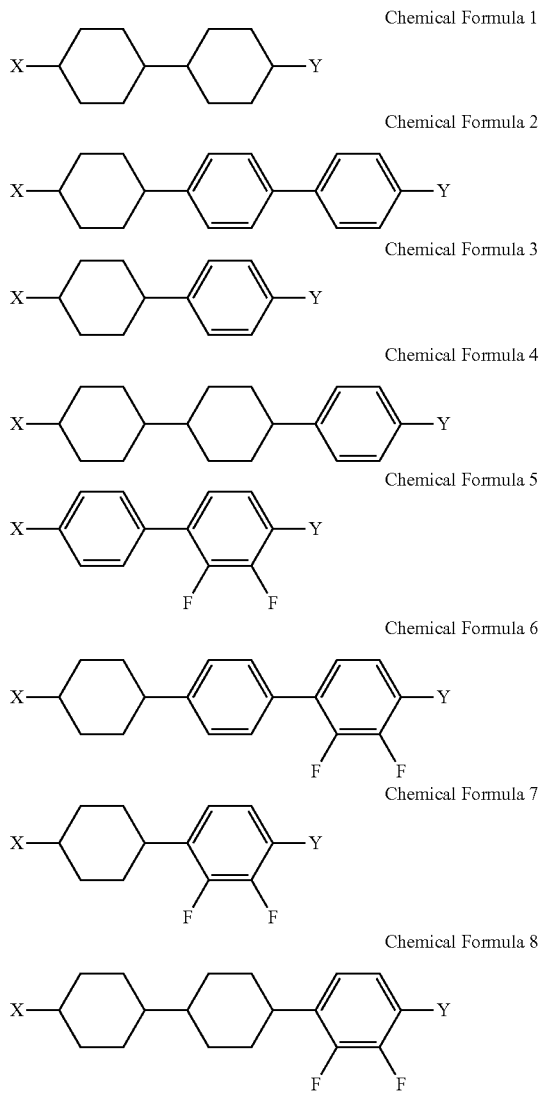

In Chemical Formulas 1 to 8, X and Y may be each independently an alkenyl group or an alkyl group. A total number of carbon atoms in the alkenyl group may be in a range of 1 to 7. A total number of carbon atoms in the alkyl group may be in the range of 1 to 7.

The liquid crystal compound represented by Chemical Formula 1 may include a first liquid crystal compound in which X and Y may be alkyl groups, and may include a second liquid crystal compound in which X may be one of an alkyl group and an alkenyl group and in which Y may be the other of the alkyl group and the alkenyl group.

The second liquid crystal compound may be in a range of 18 to 36 parts by weight of the liquid crystal compound represented by Chemical Formula 1.

The liquid crystal composition may include a compound represented by Chemical Formula 9,

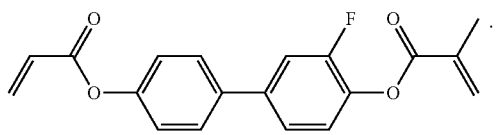

The compound represented by Chemical Formula 9 may be in a range of 0.2 to 0.5 parts by weight of the liquid crystal composition.

The liquid crystal composition may have a first elastic modulus (K33) in a range of 15 pN to 18 pN, and may satisfy Mathematical Expression 1, $$6 \leq \text{rotational viscosity}(\gamma 1)/\text{first elastic modulus}(K33) \leq 7.2. \qquad \text{Mathematical Expression 1}$$

The liquid crystal composition may have a second elastic modulus K11 in a range of 12 pN to 15 pN.

The liquid crystal composition may have a refractive index anisotropy ($\Delta n$) in a range of 0.100 to 0.104.

The liquid crystal composition may have a dielectric anisotropy ($\Delta \varepsilon$) in a range of $-2.9$ to $-3.3$.

An embodiment may be related to a display device. The display device may include the following elements: a first substrate including a pixel electrode; a second substrate including a common electrode; and a liquid crystal layer interposed between the first substrate and the second substrate. The liquid crystal layer may include a liquid crystal composition having one or more of the above-described features.

The display device may have a phase difference in a range of 310 nm to 340 nm.

The liquid crystal layer may include a liquid crystal aligned to have a pretilt angle according to a polymer network composed of polymers of reactive mesogens represented by Chemical Formula 9.

BRIEF DESCRIPTION OF THE DRAWINGS

Each of FIG. 7, FIG. 8.

Each of FIG. 10

DETAILED DESCRIPTION OF EMBODIMENTS

Example embodiments are described with reference to the accompanying drawings. Practical embodiments may be embodied in different forms and should not be construed as limited to the example embodiments.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

When a first element is referred to as being "on" a second element, the first element can be directly on the second element, or one or more intervening elements may be present between the first element and the second element. The same reference numbers may indicate the same components.

The term "drive" may mean "control." The term "connect" may mean "electrically connect." The term "insulate" may mean "electrically insulate" or "electrically isolate." The term "alignment" may mean "orientation." The term "align" may mean "orient." The term "improved" may mean "satisfactory" or "desirable." The expression "a range of num1 to num2 parts by weight of C" may mean "a range of num1 parts by weight of C to num2 parts by weight of C."

Figure 1:
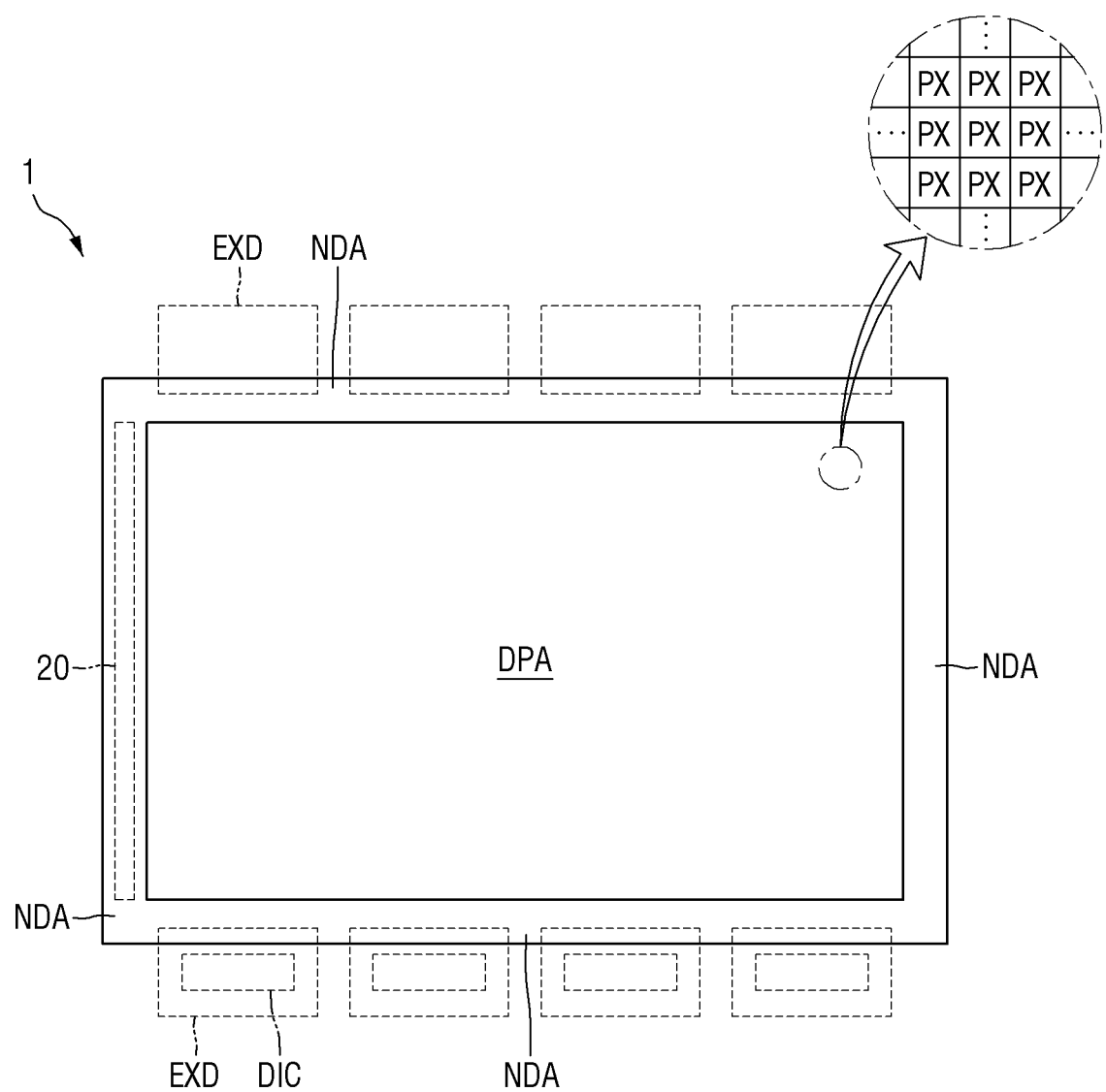
FIG. 1 is a plan view of a display device according to an embodiment.

FIG. 1 is a plan view of a display device 1 according to an embodiment.

The display device 1 may be applied to a smartphone, a mobile phone, a tablet PC, a personal digital assistant (PDA), a portable multimedia player (PMP), a television, a game machine, a wristwatch-type electronic device, a head-mounted display, a monitor of a personal computer, a laptop computer, a car navigation system, a car's dashboard, a digital camera, a camcorder, an external billboard, an electronic billboard, a medical device, an inspection device, a household appliance (such as a refrigerator or a washing machine), or an Internet-of-Things device. The television may have a high resolution or an ultra-high resolution.

In addition, the display device 1 according to the exemplary embodiments may be classified into various types according to a display method. Examples of the display device may include a liquid crystal display (LCD), an organic light emitting display (OLED), an inorganic light emitting display (inorganic EL), a quantum dot light emitting display (QED), a micro-LED display, a nano-LED display, a plasma display device (PDP), a field emission display (FED) and a cathode ray tube (CRT) display, an electrophoretic display (EPD) and the like. Hereinafter, the liquid crystal display will be described as an example of the display device, and the liquid crystal display applied to the embodiment will be simply referred to as a display device unless special distinction is required. However, the embodiment is not limited to the liquid crystal display, and other display devices mentioned above or known in the art may be applied within the scope of the same inventive concept.

The display device 1 according to the exemplary embodiment may have a square shape, e.g., a rectangular shape in plan view. In a case where the display device 1 is a television, the display device 1 is disposed such that its long side extends in a horizontal direction. However, the disclosure is not limited thereto, and the long side of the display device 1 may extend in a vertical direction. Alternatively, the display device 1 may be installed to be rotatable such that its long side is variably positioned to extend in the horizontal or vertical direction.

The display device 1 may include a display area DPA and a non-display area NDA. The display area DPA may display an image according to input signals. The non-display area NDA may abut the display area DPA may have a rectangular shape in plan view similar to the overall shape of the display device 1.

The display area DPA may include pixels PX. The pixels PX may be arranged in a matrix. The shape of each pixel PX may be rectangular or square in plan view. However, each pixel PX may have a rhombic shape of which each side is inclined with respect to one side direction of the display device 1. The pixels PX may include various color pixels PX. For example, the pixels PX may include a red pixel, a green pixel PX, and a blue pixel. The color pixels PX may be alternately arranged in stripes or according to a PENTILE™ format.

The non-display areas NDA may be disposed around the display area DPA. The non-display areas NDA may completely or partially surround the display area DPA. The display area DPA may have a rectangular shape, and the non-display areas NDA may be disposed adjacent to four sides of the display area DPA. The non-display areas NDA may form or correspond to a bezel of the display device 1.

In the non-display area NDA, a driving circuit or a driving element for driving the display area DPA may be disposed. Pads may be disposed on a substrate of the display device 1. The pads may be provided in a first section of the non-display area NDA disposed adjacent to a first long side (lower side in FIG. 1) of the display device 1, and a second section of the non-display area NDA disposed adjacent to a second long side (upper side in FIG. 1) of the display device 1. External devices EXD may be mounted on pad electrodes of the pads. The external devices EXD may include at least one of, a connection film, a printed circuit board, a driver integrated circuit (DIC), a connector, and a wire connection film. A gate driver 20 may be formed directly on the substrate of the display device 1 and may be provided in a third section of the non-display area NDA disposed adjacent to a first short side (left side in FIG. 1) of the display device 1.

Figure 2:
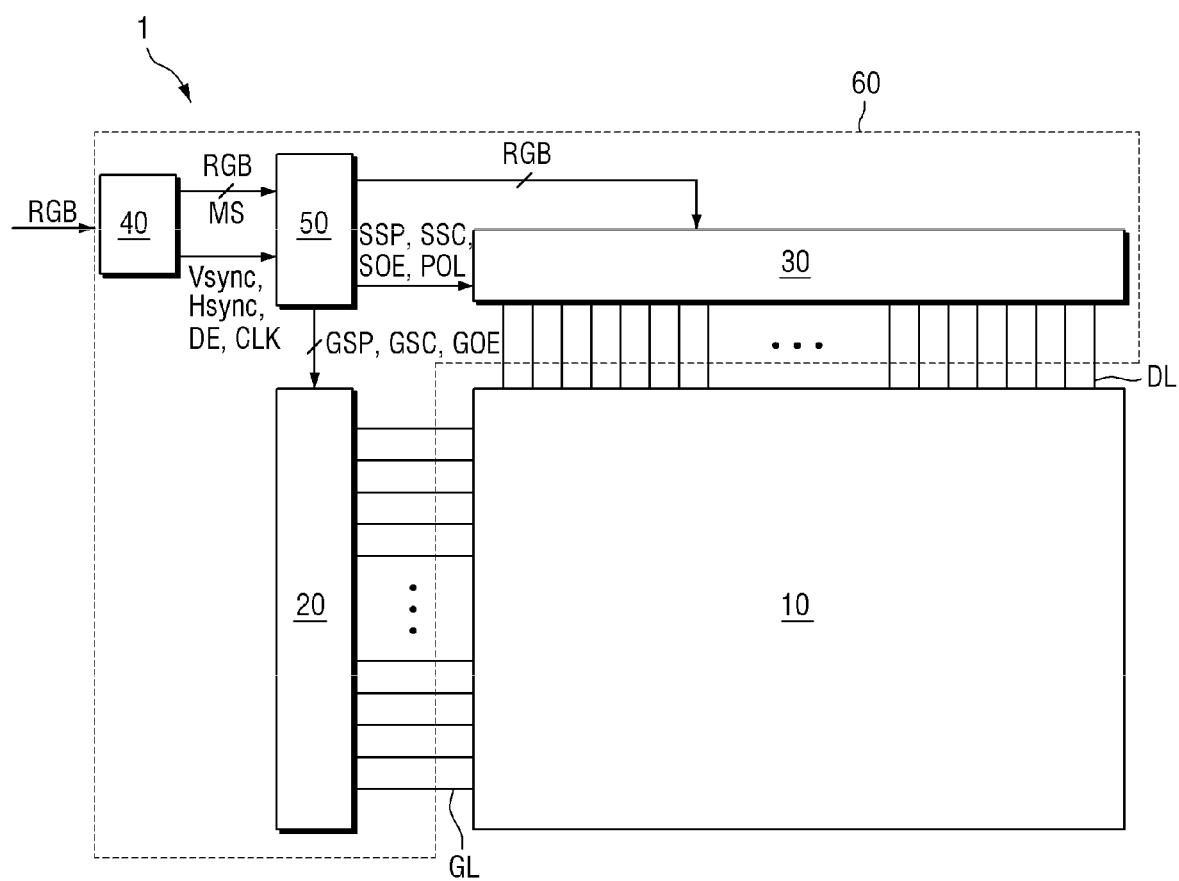
FIG. 2 is a block diagram schematically showing a display device according to an embodiment.

FIG. 2 is a block diagram schematically showing a display device according to an embodiment.

Referring to FIG. 2, a display device 1 may include a display panel 10 that includes a liquid crystal layer. The display panel 10 may include liquid crystal cells arranged in a matrix at cross sections of data lines DL and gate lines GL.

The display device 1 may include a driving unit 60 for driving the display panel 10. The driving unit 60 changes a driving mode depending on whether image data RGB inputted from an external system is a moving image/video or a still image. For example, when the image data RGB is a moving image, the driving unit 60 may be driven in a high speed driving mode having a high driving frequency. When the image data RGB is a still image, the driving unit 60 may be driven in a low speed driving mode having a low driving frequency. The driving unit 60 may include a host system 40, a timing controller 50, a data driver 30, and a gate driver 20.

The host system 40 receives the image data RGB from the external system, generates a driving mode signal MS corresponding to the image data RGB, and outputs the driving mode signal MS to the timing controller 50. When the image data RGB is a moving image, the host system 40 may generate a driving mode signal MS corresponding to the moving image; when the image data RGB is a still image, the host system 40 may generate a driving mode signal MS corresponding to the still image. When the image data RGB is a moving image, the driving mode signal MS may be a signal for operating in a high speed mode, whereas when the image data RGB is a still image, the driving mode signal MS may be a signal for operating in a low speed mode to reduce power consumption.

The timing controller 50 receives digital video data RGB of an input image from the host system 40 through a low voltage differential signaling (LVDS) interface. The timing controller 50 may supply the digital video data RGB of the input image to the data driver 30 through a mini-LVDS interface. In addition, the timing controller 50 may receive the driving mode signal MS from the host system 40. The timing controller 50 may arrange the digital video data RGB inputted from the host system 40 according to the arrangement of the pixel array and then supply the digital video data RGB to the data driver 30.

The timing controller 50 receives timing signals such as a vertical synchronization signal Vsync, a horizontal synchronization signal Hsync, a data enable signal DE, and a dot clock CLK from the host system 40 to generate control signals for controlling operation timings of the data driver 30 and the gate driver 20. The control signals may include a gate timing control signal for controlling an operation timing of the gate driver 20 and a source timing control signal for controlling an operation timing of the data driver 30.

The gate timing control signal may include a gate start pulse GSP, a gate shift clock GSC, a gate output enable signal GOE, and the like. The gate start pulse GSP may be applied to a gate driver integrated circuit (IC) for controlling the gate driver IC to generate a first gate pulse. The gate shift clock GSC is a clock signal inputted in common to gate driver ICs for shifting the gate start pulse GSP. The gate output enable signal GOE may control outputs of the gate driver ICs.

The source timing control signal may include a source start pulse SSP, a source sampling clock SSC, a polarity control signal POL, and a source output enable signal SOE, and the like. The source start pulse SSP may control a data sampling start timing of the data driver 30. The source sampling clock SSC may be a clock signal that controls a sampling timing of data in the data driver 30 based on a rising or falling edge. The polarity control signal POL may control polarities of data voltages sequentially outputted from each of data driver ICs. The source output enable signal SOE may control an output timing of the data driver 30.

The timing controller 50 may time-divide one frame into n subframes (wherein n is a positive integer of 2 or more), and may drive the gate lines GL through each subframe for interlaced driving. The timing controller 50 may group the gate lines GL into n gate groups, and match the n gate groups to the n subframes according to a driving order of the n gate groups.

In each subframe, the timing controller 50 may control an operation of the gate driver 20 to complete a sequential scan of the gate lines GL included in a corresponding gate group during 1/n of one subframe period. The timing controller may generate a buffer operation control signal to cut off a driving power applied to buffer units of the data driver 30 during (n−1)/n (except the 1/n) of the one subframe period. The driving of the data driver 30 may be stopped during a skip period.

The data driver 30 may include a shift register, a latch array, a digital-to-analog converter, an output circuit, and the like. The data driver 30 may latch the digital video data RGB in response to the source timing control signal, may convert the latched data into an analog positive/negative gamma compensation voltage, and may supply data voltages (with polarities being inverted at a predetermined cycle) to the data lines DL through a plurality of output channels. The output circuit includes a plurality of buffer units. The buffer units are connected to the output channels, and each of the output channels may be connected to a corresponding one of the data lines DL. The data driver 30 controls the polarities of the data voltages outputted to the output channels in a column inversion method to reduce power consumption. Based on the column inversion method, the polarities of the data voltages outputted through the same output channel may be inverted on a subframe basis. In addition, the polarities of the data voltages outputted through adjacent output channels may be opposite to each other.

The gate driver 20 may supply gate pulses to the gate lines GL by the aforementioned interlaced driving method in response to the gate timing control signals using a shift register and a level shifter. The data driver 30 and the gate driver 20 may be mounted by a chip on glass (COG) or chip on film (COF) method. The gate driver 20 may be directly formed on a substrate.

Figure 3:
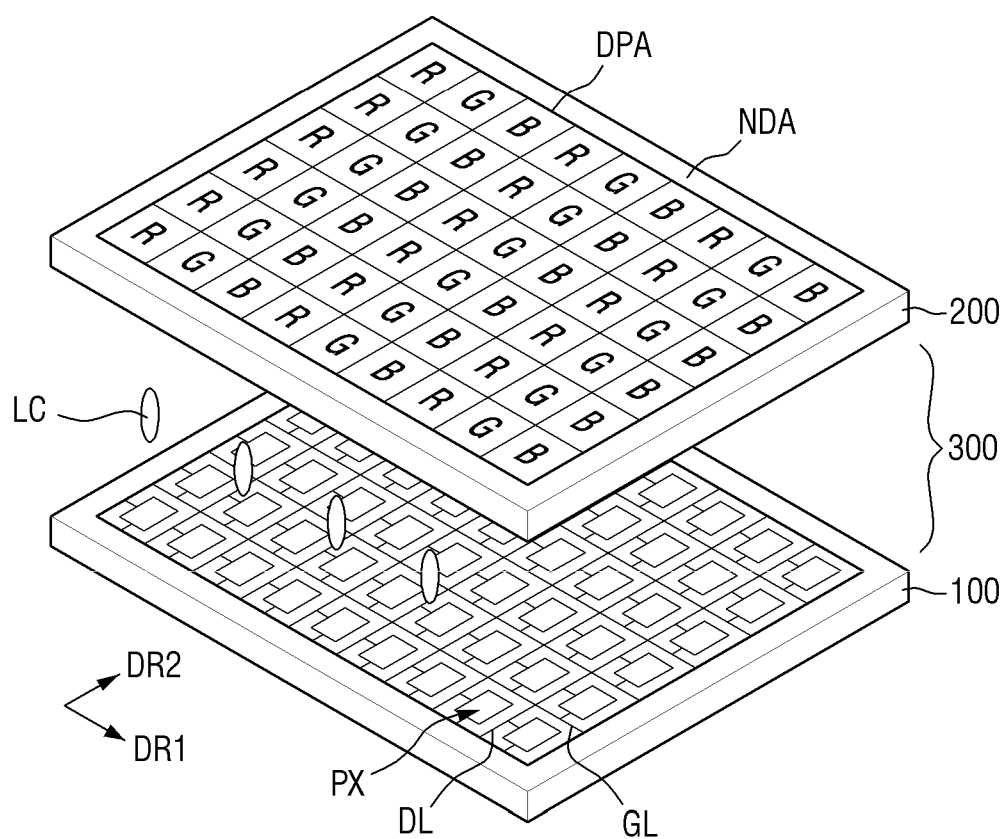
FIG. 3 is a perspective view schematically showing a display device according to an embodiment.

FIG. 3 is a perspective view schematically showing a display device according to an embodiment.

Referring to FIG. 3, the display device may include a first substrate 100, a second substrate 200 overlapping the first substrate 100, and a liquid crystal layer 300 interposed between the first substrate 100 and the second substrate 200. The liquid crystal layer 300 may include a plurality of liquid crystals LC, and the liquid crystal LC may have negative dielectric anisotropy.

The display device may include a display area DPA and a non-display area NDA. The display area DPA includes a plurality of pixels PX. Each pixel PX may display one of several primary colors. Gate lines GL extend in a first direction DR1 and data lines DL extend in a second direction DR2 so that a gate driving signal and a data driving signal may be delivered to each of the pixels PX.

Liquid crystal cells of the pixels PX display an image or video by adjusting an amount of light transmitted according to a difference between a data voltage applied to a pixel electrode and a common voltage applied to a common electrode. The common electrode may be formed on a color filter array substrate for implementing a vertical electric field driving method, which may include a twisted nematic (TN) mode and/or a vertical alignment (VA) mode. Alternatively, the common electrode may be formed on the first substrate 100, e.g., on a thin film transistor array substrate together with the pixel electrode for implementing a horizontal electric field driving method, which may include an in-plane switching (IPS) mode and/or a fringe field switching (FFS) mode.

The first substrate 100 includes the data lines DL, the gate lines GL, thin film transistors, pixel electrodes connected one-to-one to the thin film transistors, storage capacitors (not shown) connected one-to-one to the pixel electrodes, and the like. A black matrix and a color filter may be arranged on the second substrate 200. On each of the first substrate 100 and the second substrate 200, a polarizing plate may be attached, and an alignment layer for setting a pre-tilt angle of liquid crystals may be arranged.

The display device may be implemented in at least one of a liquid crystal mode, a TN mode, a VA mode, an IPS mode, and an FFS mode. The display device may be/include at least one of a transmissive liquid crystal display, a transflective liquid crystal display, a reflective liquid crystal display, and the like. In the transmissive liquid crystal display and the transflective liquid crystal display, a backlight unit is required. The backlight unit may be a direct type backlight unit or an edge type backlight unit.

Figure 4:
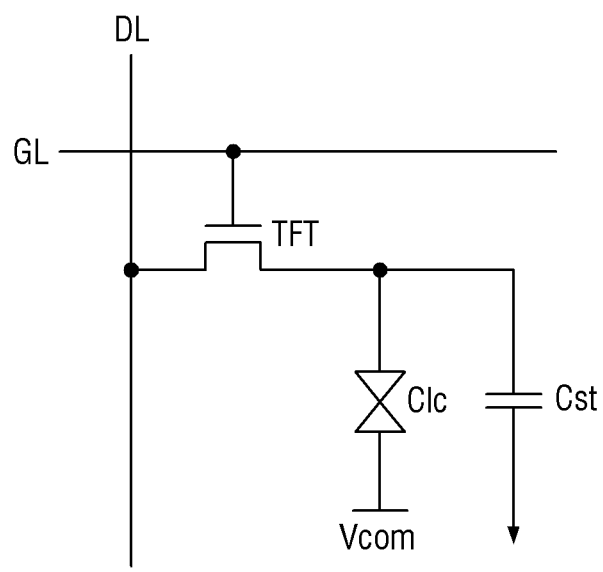
FIG. 4 is a circuit diagram schematically showing an equivalent circuit of a pixel according to an embodiment.
Figure 5:
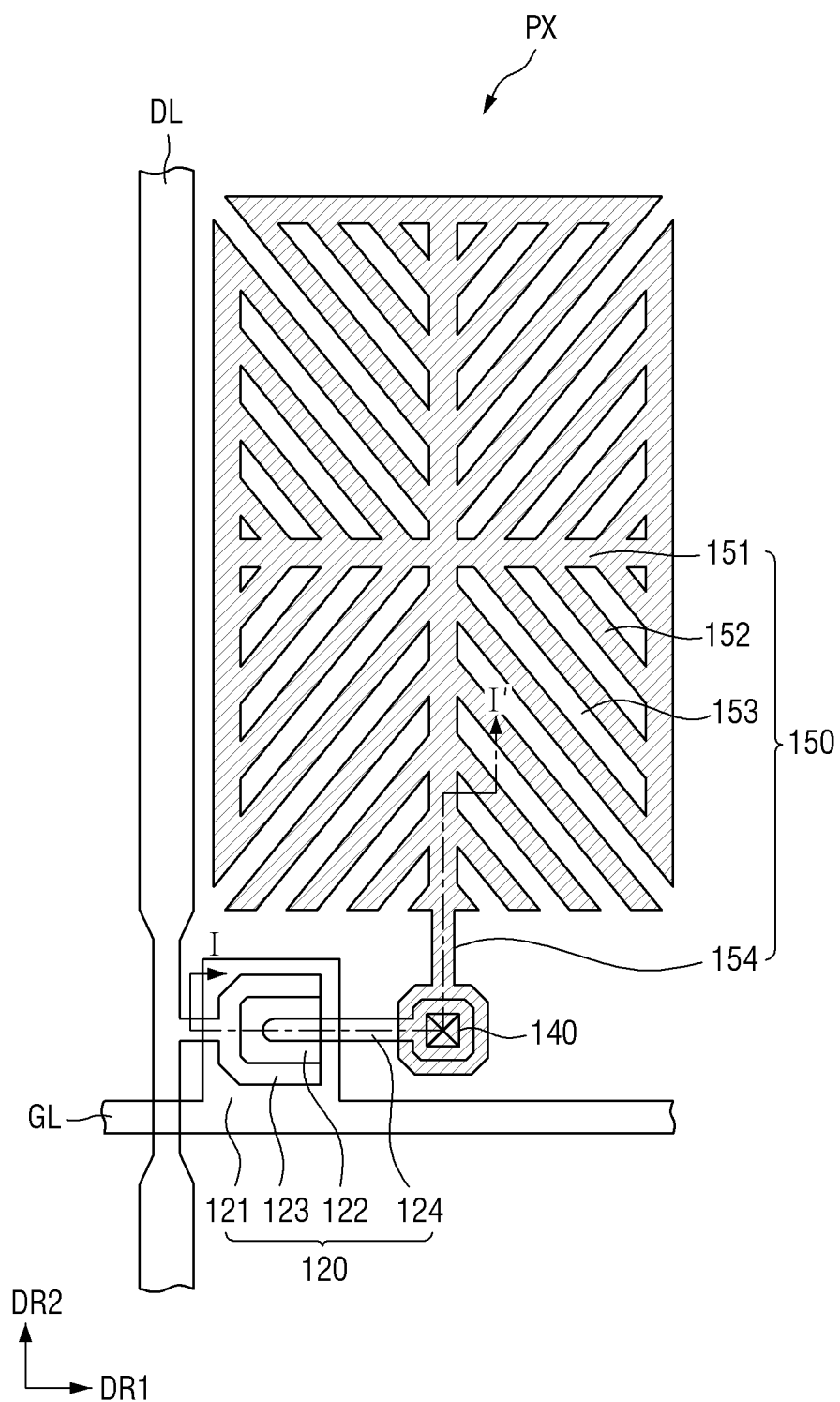
FIG. 5 is a schematic diagram of a layout (or plan view) of a pixel according to an embodiment.
Figure 6:
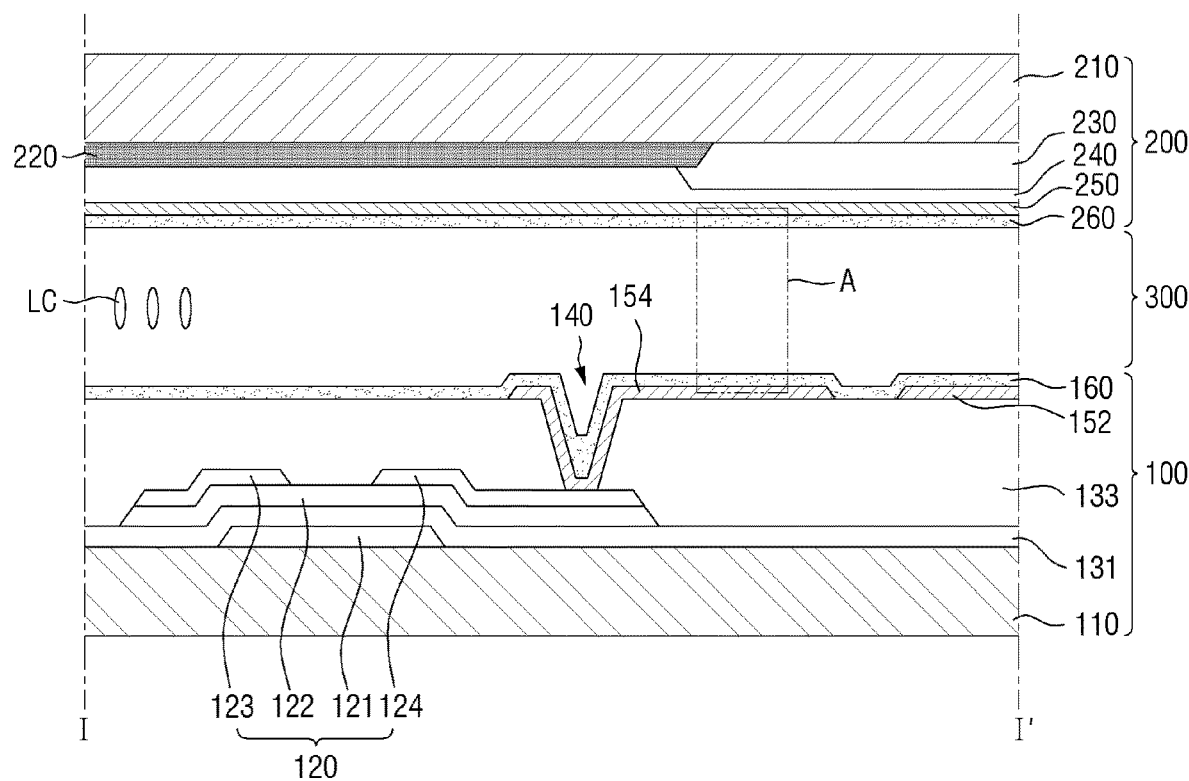
FIG. 6 is a view schematically showing a cross-sectional structure taken along line I-I' of FIG. 5 according to an embodiment.
Figure 7:
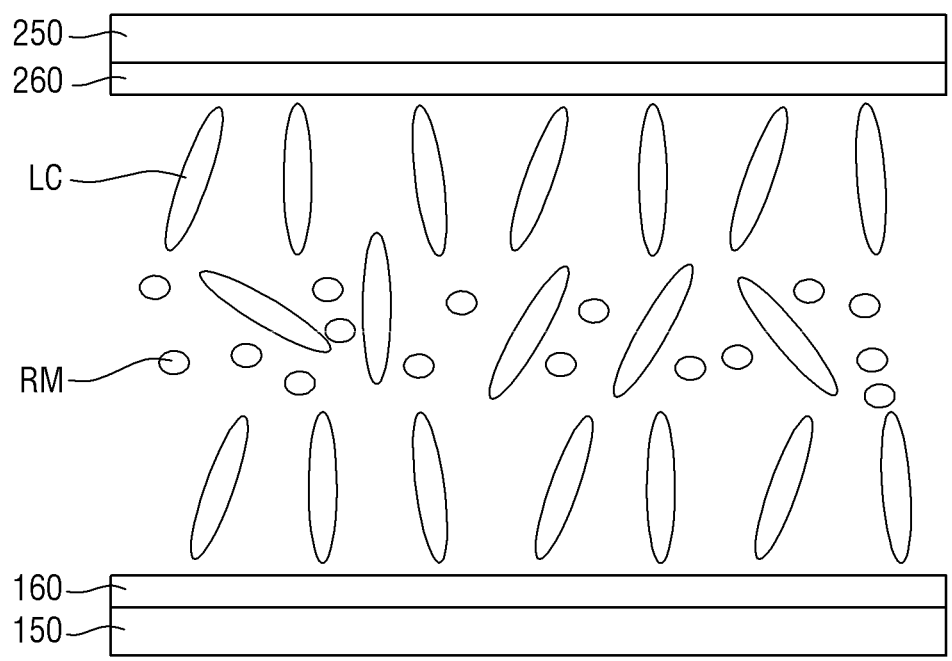
Figure 8:
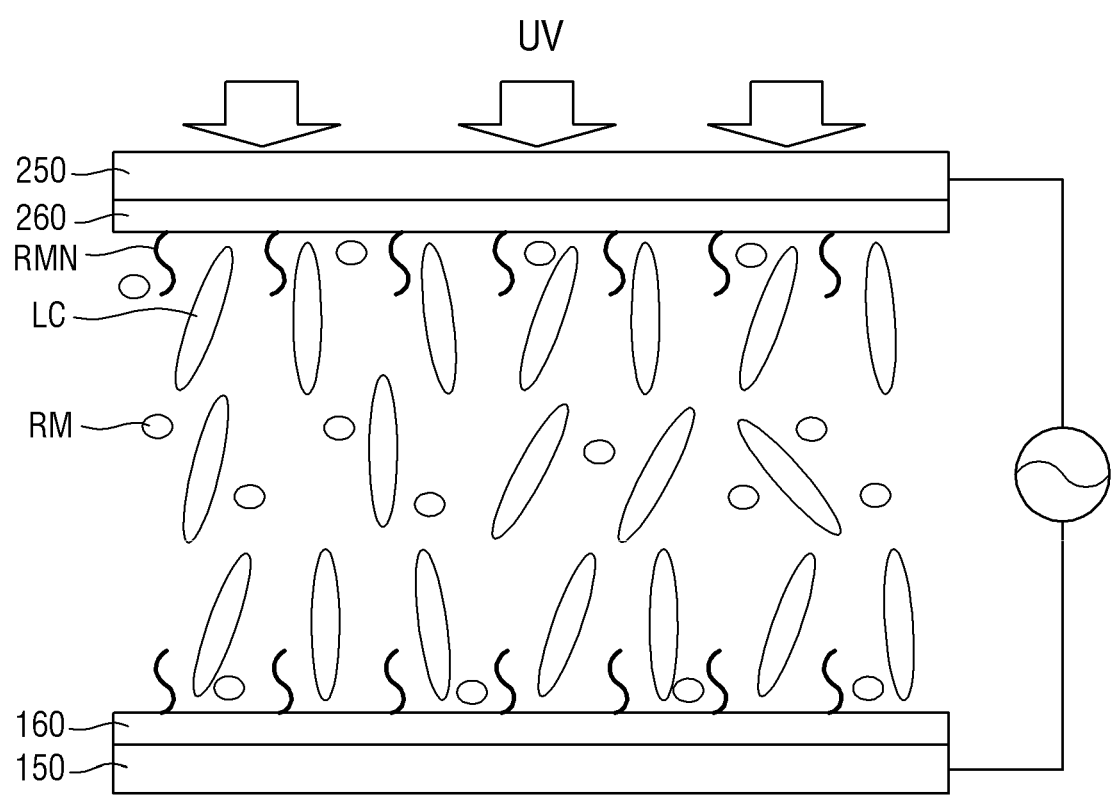
Figure 9:
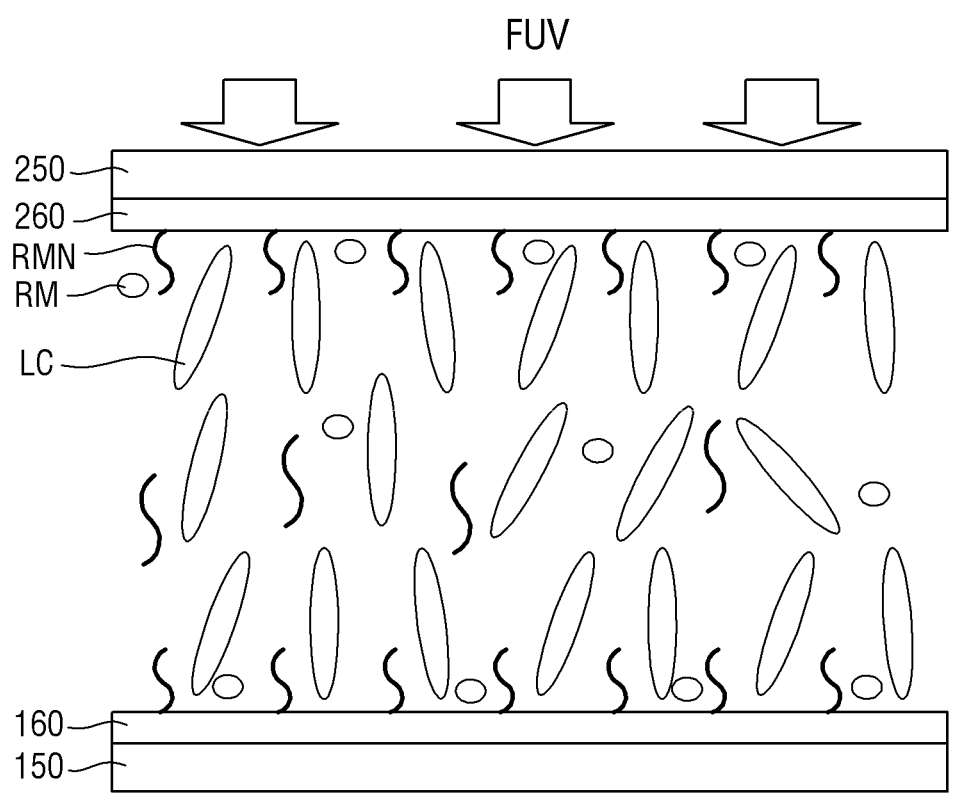
FIG. 9 is a cross-sectional view schematically showing region A of FIG. 6 according to an embodiment.
Figure 10:
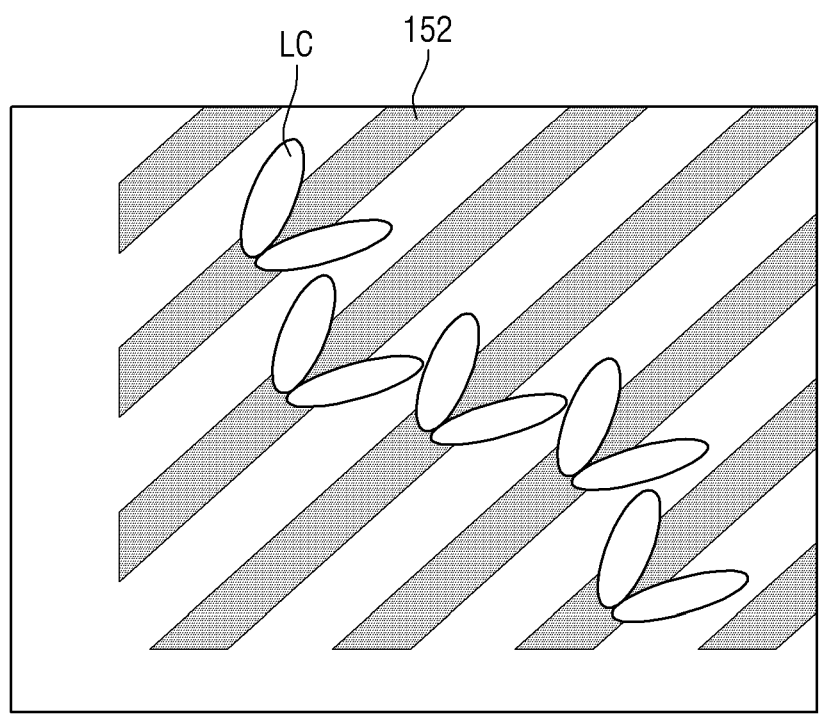
Figure 11:
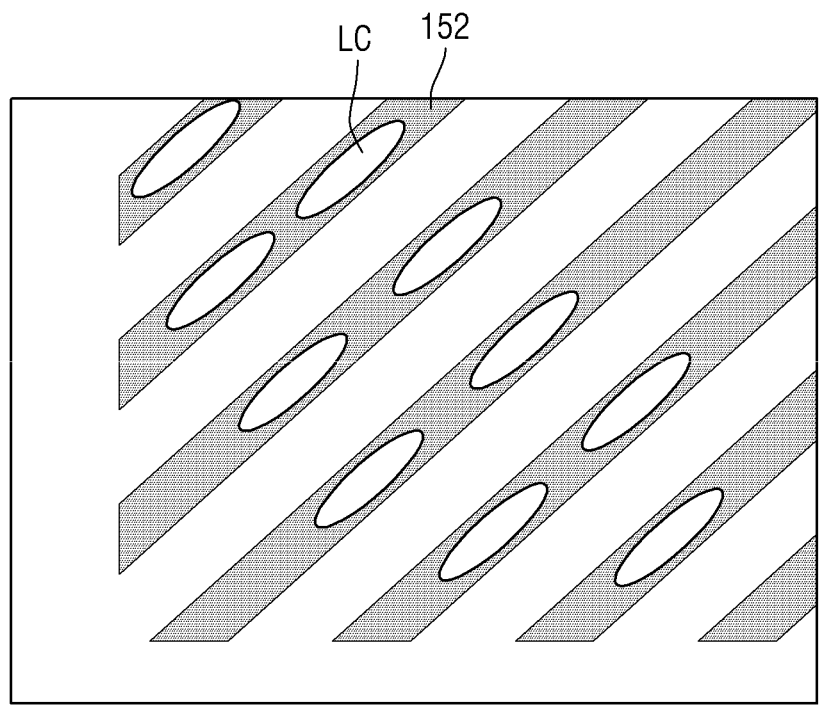
FIG. 11 is a schematic diagram illustrating a liquid crystal arrangement according to an embodiment.

FIG. 4 is a circuit diagram schematically showing an equivalent circuit of a pixel of a display device according to an embodiment. FIG. 5 is a schematic diagram of a planar layout of a pixel according to an embodiment. FIG. 6 is a view schematically showing a cross-sectional structure taken along line I-I' of FIG. 5 according to an embodiment. Each of FIGS. 7, 8, and 9 is a cross-sectional view schematically showing region A of FIG. 6 according to an embodiment. Each of FIGS. 10 and 11 is a schematic diagram of a liquid crystal arrangement according to an embodiment.

Referring to FIG. 4, the display device converts digital video data into an analog data voltage based on a gamma reference voltage and supplies the data voltage to a data line DL. Further, the display device supplies a scan pulse to a gate line GL to charge a liquid crystal cell Clc with the data voltage. A gate electrode of a thin film transistor TFT is connected to the gate line GL, a source electrode of the thin film transistor TFT is connected to the data line DL, and a drain electrode of the thin film transistor TFT is connected to a pixel electrode of the liquid crystal cell Clc and one electrode of a storage capacitor Cst.

A common voltage Vcom is supplied to a common electrode of the liquid crystal cell Clc. The storage capacitor Cst is charged with the data voltage applied from the data line DL when the thin film transistor TFT is turned on and may maintain a voltage of the liquid crystal cell Clc. When the scan pulse is applied to the gate line GL, the thin film transistor TFT is turned on to form a channel between the source electrode and the drain electrode, so that a voltage on the data line DL is applied to the pixel electrode of the liquid crystal cell Clc. At this time, the arrangement of liquid crystal molecules of the liquid crystal cell Clc is changed by an electric field between the pixel electrode and the common electrode, thereby varying transmission of light through the liquid crystal cell Clc.

Referring to FIG. 5 and FIG. 6, the first substrate 100 may include a switching element 120 for controlling an orientation of the liquid crystals LC in the liquid crystal layer 300, and the second substrate 200 may confine the liquid crystal layer 300 together with the first substrate 100.

The first substrate 100 may include a first insulating substrate 110, a switching element 120 disposed on the first insulating substrate 110, and a pixel electrode 150 disposed on the switching element 120.

The first insulating substrate 110 may be a transparent insulating substrate. For example, the first insulating substrate 110 may be a glass or plastic substrate. The first insulating substrate 110 may be flexible.

The switching element 120 may be a thin film transistor including a gate electrode 121 disposed on the first insulating substrate 110, a semiconductor layer 122 disposed on the gate electrode 121, and a source electrode 123 and a drain electrode 124 spaced from each other and disposed on the semiconductor layer 122.

The gate electrode 121 may be connected to the gate line GL to transmit a gate driving signal. The gate electrode 121 may be formed of at least one of molybdenum (Mo), aluminum (Al), chromium (Cr), gold (Au), titanium (Ti), nickel (Ni), neodymium (Nd), copper (Cu), and an alloy of some of the above materials. The gate electrode 121 may have a multilayer structure including at least two of molybdenum (Mo), aluminum (Al), chromium (Cr), gold (Au), titanium (Ti), nickel (Ni), neodymium (Nd), copper (Cu), and an alloy of some of the above materials. For example, the gate electrode 121 may have a double-layer structure of molybdenum-aluminum-neodymium or molybdenum-aluminum.

A gate insulating layer 131 that insulates the gate electrode 121 may be disposed on the gate electrode 121. The gate insulating layer 131 may be formed of silicon oxide (SiOx), silicon nitride (SiNx), or silicon oxynitride (SiOxNy), and may be a single layer or include multiple layers.

The semiconductor layer 122 may be disposed on the gate insulating layer 131. The semiconductor layer 122 may overlap the gate electrode 121 and may be disposed on the gate insulating layer 131. The semiconductor layer 122 may be formed of a silicon semiconductor or an oxide semiconductor. The silicon semiconductor may include amorphous silicon or crystallized polycrystalline silicon. Polycrystalline silicon having high mobility (100 $cm^2/Vs$ or more) may have low energy consumption and excellent reliability. The oxide semiconductor may have a low off-current.

The source electrode 123 may be connected to the data line DL to transmit a data driving signal, and the drain electrode 124 may be electrically connected to the pixel electrode 150.

Each of the source electrode 123 and the drain electrode 124 may be a single layer or may include multiple layers. When each of the source electrode 123 and the drain electrode 124 is a single layer, they may be formed of one of molybdenum (Mo), aluminum (Al), chromium (Cr), gold (Au), titanium (Ti), nickel (Ni), neodymium (Nd), copper (Cu), or an alloy of some of the above materials. When each of the source electrode 123 and the drain electrode 124 include multiple layers, each of them may consist of two layers of copper-titanium or molybdenum-aluminum-neodymium, three layers of titanium-aluminum-titanium, molybdenum-aluminum-molybdenum or molybdenum-neodymium-molybdenum.

A passivation layer 133 for protecting the switching element 120 may be disposed on the switching element 120. The passivation layer 133 may be formed of an inorganic material, an organic material, or both. When the passivation layer 133 is formed of an inorganic material, it may include one or more layers of silicon oxide (SiOx), silicon nitride (SiNx), and silicon oxide nitride (SiOxNy). When the passivation layer 133 is formed of an organic material, it may be formed of an organic material such as at least one of polyimide, benzocyclobutene series resin, and acrylate series resin. When the passivation layer 133 includes an inorganic material and an organic material, the organic material is disposed on the inorganic material to planarize a step.

The pixel electrode 150 may be disposed on the passivation layer 133. The pixel electrode 150 may be connected to the drain electrode 124 through a contact hole 140 and may receive a data driving signal.

The pixel electrode 150 may include a first stem 151, a plurality of branches 152 extending from the first stem 151 and spaced apart from each other with intervening slits 153, and an extension 154 extending to the switching element 120.

The stem 151 may include a horizontal stem extending in the first direction DR1 and a vertical stem extending in the second direction DR2. The stem 151 may divide the pixel electrode 150 into sub-regions, i.e., domains. The stem 151 may have a cross shape. In this case, the pixel electrode 150 may be divided into four sub-regions by the stem 151. Extending directions of the branches 152 positioned in each of the sub-regions may be different from each other. For example, as shown in FIG. 5, the branches 152 positioned in an upper right sub-region may extend obliquely in an upper-right direction from the stem 151, and the branches positioned in a lower right sub-region may extend obliquely in a lower-right direction from the stem 151. In addition, the branches 152 positioned in an upper left sub-region may extend obliquely in an upper-left direction from the stem 151, and the branches 152 positioned in a lower left sub-region may extend obliquely in a lower-left direction from the stem 151. The extension 154 may extend from the stem 151 and/or the branches 152 to the switching element 120 and may be connected to a drain electrode 124 through a contact hole 140.

The pixel electrode 150 may include a transparent conductive material through which light can pass. The pixel electrode 150 may be formed of indium tin oxide (ITO), indium zinc oxide (IZO), or indium tin zinc oxide (ITZO). Any material that is transparent and conductive may be used as the pixel electrode 150.

A first alignment layer 160 may be disposed on the pixel electrode 150. The first alignment layer 160 may include a vertical alignment unit, and may induce an initial vertical alignment/orientation of liquid crystals LC in a liquid crystal layer 300 through the vertical alignment unit. The first alignment layer 160 may include polyamic acid or polyimide.

The second substrate 200 may include a second insulating substrate 210, a light blocking member 220 and a color filter 230 disposed on the second insulating substrate 210, and a common electrode 250 disposed on the light blocking member 220 and the color filter 230.

The second insulating substrate 210 may be transparent, like the first insulating substrate 110. The light blocking member 220 may be formed of a material that blocks light transmission by absorbing or reflecting light of at least a specific wavelength band. For example, the light blocking member 220 may be a black matrix. The light blocking member 220 may be disposed at a boundary between adjacent pixels to prevent color mixing defects.

The color filter 230 may include a material that absorbs a specific wavelength band of transmitted light or a material that shifts or converts a wavelength of transmitted light into a specific wavelength. The color filter 230 may selectively transmit light of a specific wavelength band. In FIG. 6, the light blocking member 220 and the color filter 230 are disposed on the second substrate 200. At least one of the light blocking member 220 and the color filter 230 may be disposed on the first substrate 100.

An overcoat layer 240 may be disposed on the light blocking member 220 and the color filter 230. The overcoat layer 240 may include an organic material. The overcoat layer 240 may planarize a step caused by components stacked on the second substrate 210.

The common electrode 250 may be disposed on the overcoat layer 240. The common electrode 250 may overlap a plurality of pixel electrodes 150 and may apply a common voltage. The common electrode 250 may form an electric field in the liquid crystal layer 300 together with the pixel electrode 150 to control an orientation of the liquid crystals LC. In FIG. 6, the pixel electrode 150 is arranged on the first substrate 100 and the common electrode 250 is arranged on the second substrate 200. The pixel electrode 150 and the common electrode 250 may be arranged on the same substrate.

A second alignment layer 260 may be disposed on the common electrode 250. The second alignment layer 260 may be analogous the first alignment layer 160.

The liquid crystal layer 300 may be disposed between the first substrate 100 and the second substrate 200. The liquid crystal layer 300 may include a plurality of liquid crystals LC. A liquid crystal composition constituting the liquid crystal layer 300 may have negative dielectric anisotropy. In an initial alignment state, the liquid crystal LC may maintain a stable state in which its major axis is oriented in a direction substantially perpendicular to a predetermined surface or with a predetermined pretilt angle relative to the surface.

The liquid crystal LC having negative dielectric anisotropy may be inclined such that its major axis forms a predetermined angle with respect to the direction of a vertical electric field formed by the pixel electrode 150 and the common electrode 250. As a direction of the major axis of the liquid crystal LC is changed, a phase difference delay value is changed, and accordingly, an amount of light penetrating through the liquid crystal layer 300 may be adjusted. In the initial alignment/orientation state of the liquid crystal LC, no electric field is formed in the liquid crystal layer 300.

Referring to FIGS. 7 to 9, a display device may be in a polymer stabilized-vertical alignment/orientation mode (PS-VA mode). In the PS-VA mode, the liquid crystal LC may be aligned (and/or oriented) to have a pretilt through a polymer network composed of polymers of reactive mesogens (RM), so that the liquid crystal LC may be stabilized.

A liquid crystal layer 300 may include liquid crystals LC and reactive mesogens RM. The reactive mesogen (RM) may form a polymer network composed of polymers of reactive mesogens (RM) through a UV exposure process.

Referring to FIG. 7, the liquid crystals LC and the reactive mesogens RM of the liquid crystal layer 300 may be randomly arranged in an initial state.

Referring to FIG. 5, FIG. 8, and FIG. 11, when an electric field is formed in the liquid crystal layer 300, liquid crystals LC are inclined (and/or oriented) in a direction parallel to a lengthwise direction of branches 152 of the pixel electrode 150. There may be four inclining directions of the liquid crystals LC in one pixel. When the electric field is applied to the liquid crystal layer 300 and ultraviolet light UV is radiated to the liquid crystal layer 300, the reactive mesogen (RM) undergoes polymerization reaction to form a polymer network RMN composed of polymers that contact with the first alignment layer 160 and the second alignment layer 260. The liquid crystals LC have an initial alignment direction (pretilt) determined by the polymer network RMN.

Referring to FIG. 9, in order to substantially exhaust unreacted residual reactive mesogens RM in the liquid crystal layer 300, fluorescent ultraviolet light FUV may be irradiated when manufacturing the liquid crystal layer 300.

The liquid crystal composition constituting the liquid crystal layer 300 may include a neutral liquid crystal compound and a polar liquid crystal compound containing at least one fluorine atom.

The neutral liquid crystal compound may include liquid crystal compounds represented by Chemical Formulas 1 to 4 below.

[Chemical Formula 1]

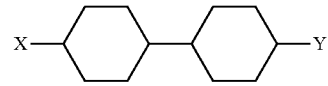

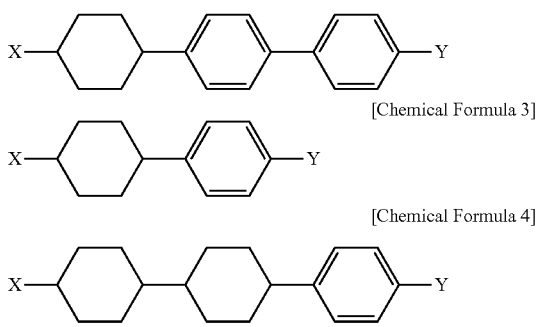

[Chemical Formula 2]

[Chemical Formula 3]

[Chemical Formula 4]

In Chemical Formulas 1 to 4, X and Y may be each independently an alkenyl group or an alkyl group having 1 to 7 carbon atoms.

Each of Chemical Formulas 1 to 4 may include an alkyl group or an alkenyl group. When both X and Y are alkyl groups or alkenyl groups, the alkyl groups may be identical to or different from each other, and the alkenyl groups may be identical to or different from each other. The alkyl groups may have the same carbon number or different carbon numbers, and the alkenyl groups may have the same carbon number or different carbon numbers.

The liquid crystal compound represented by Chemical Formula 1 may be in a range of 21.5 to 26.5 parts by weight based on 100 parts by weight of the entire liquid crystal composition. When the liquid crystal compound represented by Chemical Formula 1 is in the range of 21.5 to 26.5 parts by weight based on 100 parts by weight of the entire liquid crystal composition, stability of the liquid crystal layer may be improved (or satisfactory).

The liquid crystal compound represented by Chemical Formula 1 may include two kinds of compounds. The liquid crystal compound represented by Chemical Formula 1 may include a first liquid crystal compound and a second liquid crystal compound. In the first liquid crystal compound, at least one of X and Y is an alkyl group. In the second liquid crystal compound, at least one of X and Y is an alkenyl group. In the first liquid crystal compound, X and Y may be alkyl groups. In the second liquid crystal compound, X may be one of an alkyl group and an alkenyl group, and Y may be the other. In an embodiment, in the first liquid crystal compound, X and Y may be non-polar groups and may be alkyl groups. In the second liquid crystal compound, X (or Y) may be an alkyl group, and Y (or X) may be an alkenyl group.

The first liquid crystal compound may be a neutral compound, and the second liquid crystal compound may be a low viscosity compound. In this case, the second liquid crystal compound may be in a range of 18 to 36 parts by weight based on 100 parts by weight of the entire liquid crystal compound represented by Chemical Formula 1, and the first liquid crystal compound may be the remaining parts by weight of the liquid crystal compound represented by Chemical Formula 1. When the second liquid crystal compound is in a range of 18 to 36 parts by weight based on the liquid crystal compound represented by Chemical Formula 1, the viscosity of the liquid crystal composition may be appropriately adjusted.

The liquid crystal compound represented by Chemical Formula 2 may be in a range of 2.5 to 7.5 parts by weight based on 100 parts by weight of the entire liquid crystal composition. When the liquid crystal compound represented by Chemical Formula 2 is in a range of 2.5 to 7.5 parts by weight based on 100 parts by weight of the entire liquid crystal composition, a refractive index anisotropy ($\Delta n$), a nematic phase-isotropic transition temperature (Tni), a rotational viscosity ($\gamma 1$), and an elastic modulus (K11, K33) of the liquid crystal layer may be improved (or satisfactory).

The liquid crystal compound represented by Chemical Formula 3 may be in a range of 12.5 to 17.5 parts by weight based on 100 parts by weight of the entire liquid crystal composition. When the liquid crystal compound represented by Chemical Formula 3 is in a range of 12.5 to 17.5 parts by weight based on 100 parts by weight of the entire liquid crystal composition, stability of the liquid crystal layer may be improved (or satisfactory).

The liquid crystal compound represented by Chemical Formula 4 may be in a range of 5.5 to 10.5 parts by weight based on 100 parts by weight of the entire liquid crystal composition. When the liquid crystal compound represented by Chemical Formula 4 is in a range of 5.5 to 10.5 parts by weight based on 100 parts by weight of the entire liquid crystal composition, a refractive index anisotropy ($\Delta n$), a nematic phase-isotropic transition temperature (Tni), a rotational viscosity ($\gamma 1$), and an elastic modulus (K11, K33) of the liquid crystal layer may be improved (or satisfactory).

The liquid crystal compounds represented by the aforementioned Chemical Formulas 1 to 4 may be neutral liquid crystal compounds, and each may improve stability of the liquid crystal layer.

The polar liquid crystal compound may include liquid crystal compounds represented by Chemical Formulas 5 to 8 below.

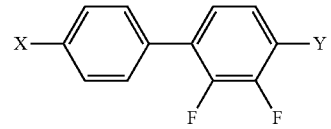

[Chemical Formula 5]

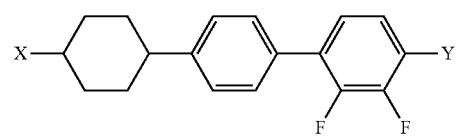

[Chemical Formula 6]

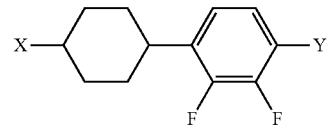

[Chemical Formula 7]

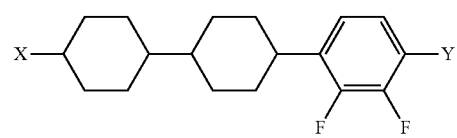

[Chemical Formula 8]

In Chemical Formulas 5 to 8, X and Y may be each independently an alkenyl group or an alkyl group having 1 to 7 carbon atoms.

Each of Chemical Formulas 5 to 8 may include an alkyl group or an alkenyl group. When both X and Y are alkyl groups or alkenyl groups, the alkyl groups may be identical to or different from each other, and the alkenyl groups may be identical to or different from each other. The alkyl groups may have the same carbon number or different carbon numbers, and the alkenyl groups may have the same carbon number or have different carbon numbers.

The liquid crystal compound represented by Chemical Formula 5 may be in a range of 7.5 to 12.5 parts by weight based on 100 parts by weight of the entire liquid crystal composition. When the liquid crystal compound represented by Chemical Formula 5 is in a range of 7.5 to 12.5 parts by weight based on 100 parts by weight of the entire liquid crystal composition, a refractive index anisotropy (Δn) and an elastic modulus (K11, K33) of the liquid crystal layer may be improved.

The liquid crystal compound represented by Chemical Formula 6 may be in a range of 2 to 7 parts by weight based on 100 parts by weight of the entire liquid crystal composition. When the liquid crystal compound represented by Chemical Formulas 6 is in a range of 2 to 7 parts by weight based on 100 parts by weight of the entire liquid crystal composition, a refractive index anisotropy (Δn), a nematic phase-isotropic transition temperature (Tni), a rotational viscosity (γ1), and an elastic modulus (K11, K33) of the liquid crystal layer may be improved.

The liquid crystal compound represented by Chemical Formula 7 may be in a range of 10.5 to 15.5 parts by weight based on 100 parts by weight of the entire liquid crystal composition. When the liquid crystal compound represented by Chemical Formula 7 is in a range of 10.5 to 15.5 parts by weight based on 100 parts by weight of the entire liquid crystal composition, a refractive index anisotropy (Δn) and an elastic modulus (K11, K33) of the liquid crystal layer may be improved.

The liquid crystal compound represented by Chemical Formula 8 may be in a range of 13 to 18 parts by weight based on 100 parts by weight of the entire liquid crystal composition. When the liquid crystal compound represented by Chemical Formulas 8 is in a range of 13 to 18 parts by weight based on 100 parts by weight of the entire liquid crystal composition, a refractive index anisotropy (Δn), a nematic phase-isotropic transition temperature (Tni), a rotational viscosity (γ1), and an elastic modulus (K11, K33) of the liquid crystal layer may be improved.

The liquid crystal compounds represented by Chemical Formulas 5 to 8 described above are polar liquid crystal compounds for improving a refractive index anisotropy (Δn) and an elastic modulus (K11, K33) of the liquid crystal layer.

The liquid crystal composition may further include a compound represented by the following Chemical Formula 9.

[Chemical Formula 9]

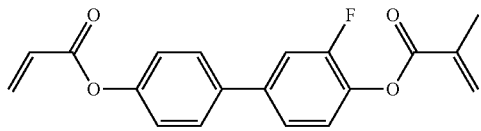

The compound represented by Chemical Formula 9 is a kind of reactive mesogen, and may include methacrylate having many reaction sites.

The compound represented by Chemical Formula 9 may be in a range of 0.2 to 0.5 parts by weight based on 100 parts by weight of the entire liquid crystal composition.

The compound represented by Chemical Formula 9 may form a polymer network composed of polymers through a UV irradiation process. The compound represented by Chemical Formula 9 may form a polymer network or may remain in the liquid crystal layer 300 without forming a polymer network.

The liquid crystal composition according to an embodiment may include liquid crystal compounds respectively represented by the aforementioned Chemical Formulas 1 to 8. In particular, the liquid crystal composition may include, in a range of 21.5 to 26.5 parts by weight of the liquid crystal compound represented by Chemical Formula 1; in a range of 2.5 to 7.5 parts by weight of the liquid crystal compound represented by Chemical Formula 2; in a range of 12.5 to 17.5 parts by weight of the liquid crystal compound represented by Chemical Formula 3; in a range of 5.5 to 10.5 parts by weight of the liquid crystal compound represented by Chemical Formula 4; in a range of 7.5 to 12.5 parts by weight of the liquid crystal compound represented by Chemical Formula 5; in a range of 2 to 7 parts by weight of the liquid crystal compound represented by Chemical Formula 6; in a range of 10.5 to 15.5 parts by weight of the liquid crystal compound represented by Chemical Formula 7; in a range of and 13 to 18 parts by weight of the liquid crystal compound represented by Chemical Formula 8.

The liquid crystal composition may have the following physical properties.

In the liquid crystal composition, a phase difference And of a liquid crystal panel is about 310 nm to about 340 nm, and an elastic modulus K33 is about 15 to about 18 pN. The liquid crystal composition may satisfy the following Mathematical Expression 1 (In Mathematical Expression 1, the elastic modulus K33 is a denominator and a rotational viscosity γ1 is a molecule).

$$6 \leq \text{rotational viscosity}(\gamma 1)/\text{elastic modulus}(K33) \leq 7.2$$ [Mathematical Expression 1]

In the liquid crystal composition, as a refractive index anisotropy Δn is decreased, a cell gap d may be relatively increased. When the cell gap d is increased, a response speed may be lowered. Accordingly, the liquid crystal composition that satisfies the condition of the above Mathematical Expression 1 may be provided to minimize the dropping of the response speed.

Referring to FIG. 10, the liquid crystal LC is driven by a fringe field. When the intensity of the fringe field is large, the liquid crystals LC may be difficult to align with the branches 152 of the pixel electrode. The liquid crystal composition may be optimized such that the liquid crystals (LC) can be aligned with the branches 152 of the pixel electrode, as shown in FIG. 11, by minimizing the elastic modulus (K11) to about 13.5 to about 15 pN.

The liquid crystal composition may have a refractive index anisotropy (Δn) in a range of about 0.100 to about 0.104, and a dielectric anisotropy (Δε) in a range of about −2.9 to about −3.3. In the liquid crystal composition, the refractive index anisotropy (Δn) may be adjusted to have a certain value according to the cell gap within a phase difference range of the liquid crystal panel, and a phase difference of the liquid crystal panel may be adjusted to be in a range of about 310 nm to about 340 nm.

In the liquid crystal composition having the above composition ratio and physical properties, liquid crystals are sufficiently aligned with the branches of the pixel electrode by reducing the refractive index anisotropy (Δn) and the elastic modulus (K11) of the liquid crystal layer. Accordingly, the transmittance of the liquid crystal layer can be improved.

Transmittance characteristics of a display device may be different if conditions of the liquid crystal composition are set differently, as illustrated in an "Example" and a "Comparative example."

Example

The display device of the "Example" was manufactured using a liquid crystal composition of Table 1 below. In the liquid crystal composition of Table 1, X and Y of the remaining compounds other than a compound of 24 parts by weight are $CH_3$. The compound of 24 part by weight is composed of 18 parts by weight of a first liquid crystal compound whose X and Y are $CH_3$, and 6 parts by weight of a second liquid crystal compound whose X is $CH_3$ and whose Y is $H_2C=CH$).

TABLE 1

| Liquid crystal composition | Content (parts by weight) |
|---|---|
| [structure: X—phenyl—phenyl(F,F)—Y] | 10 |
| [structure: X—cyclohexyl—cyclohexyl—Y] | 24 |
| [structure: X—cyclohexyl—phenyl—phenyl(F,F)—Y] | 4.5 |
| [structure: X—cyclohexyl—phenyl—phenyl—Y] | 5 |
| [structure: X—cyclohexyl—phenyl—Y] | 15 |
| [structure: X—cyclohexyl—cyclohexyl—phenyl—Y] | 8 |
| [structure: X—cyclohexyl—phenyl(F,F)—Y] | 13 |
| [structure: X—cyclohexyl—cyclohexyl—phenyl(F,F)—Y] | 15.5 |

Comparative Example

A display device of the "Comparative example" was manufactured in the same manner as in the "Example," except that a liquid crystal composition of Table 2 below was used. In the liquid crystal composition of Table 2, X and Y of the remaining compounds other than a compound of 26 parts by weight are $CH_3$. The compound of 26 parts by weight is 12 parts by weight of a first liquid crystal compound whose X and Y are $CH_3$, and 14 parts by weight of a second liquid crystal compound whose X is $CH_3$ and whose Y is $H_2C=CH$).

TABLE 2

| Liquid crystal composition | Content (parts by weight) |
|---|---|
| [structure: X—phenyl—phenyl(F,F)—Y] | 18 |
| [structure: X—cyclohexyl—cyclohexyl—Y] | 26 |
| [structure: X—cyclohexyl—phenyl—phenyl(F,F)—Y] | 2.5 |
| [structure: X—cyclohexyl—phenyl—phenyl—Y] | 8 |
| [structure: X—cyclohexyl—phenyl—Y] | 5.5 |
| [structure: X—cyclohexyl—phenyl—phenyl—Y] | 13 |
| [structure: X—cyclohexyl—phenyl(F,F)—Y] | 11.5 |
| [structure: X—cyclohexyl—cyclohexyl—phenyl(F,F)—Y] | 10.5 |

For each of the liquid crystal composition of the "Example" and the liquid crystal composition of the "Comparative example," a refractive index anisotropy, a dielectric anisotropy, a rotational viscosity, an elastic modulus (K11, K33), and elastic modulus (K33)/dielectric constant anisotropy were measured; the results are provided in Table 3 below.

TABLE 3

| | Comparative example | Example |
|---|---|---|
| Phase transition temperature (° C.) | 74.2 | 74.7 |
| Refractive index anisotropy (Δn) | 0.1091 | 0.1024 |
| Dielectric anisotropy (Δε) | −3.1 | −3.1 |
| Rotational viscosity (γ1) | 108 | 108 |

TABLE 3-continued

|  | Comparative example | Example |
| --- | --- | --- |
| Elastic modulus (K11) | 14.5 | 13.5 |
| Elastic modulus (K22) | 7.25 | 6.75 |
| Elastic modulus (K33) | 16.5 | 16.5 |
| Elastic modulus/Dielectric anisotropy (K33/Δ∈) | 5.32 | 5.32 |
| Density | 1.0068 | 1.0088 |

Referring to Table 3, for the liquid crystal composition of the "Example" compared with that of the "Comparative example," the refractive index anisotropy (Δn) was reduced by about 0.0067, and the elastic modulus (K11) was decreased by about 1.0.

Figure 12:
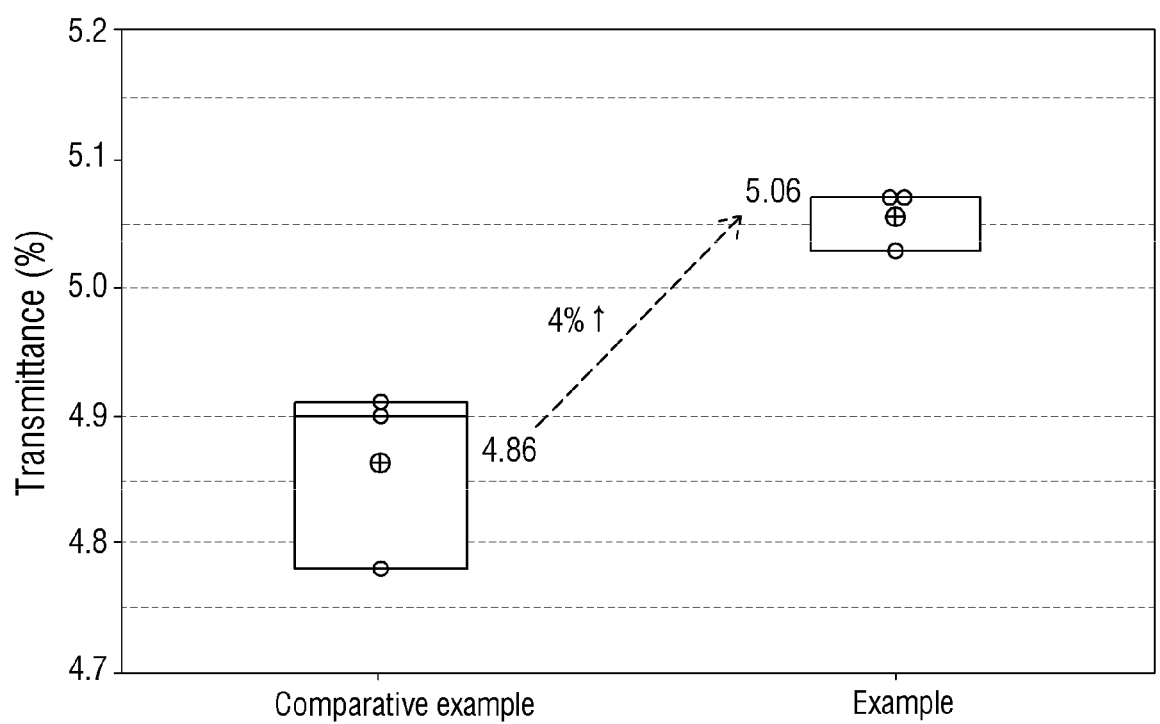
FIG. 12 is a graph showing transmittance of a display device according to a Comparative example and transmittance of a display device according to an Example.

The transmittance of the display device manufactured according to the "Example" and the transmittance of the display device manufactured according to the "Comparative example" were measured; the results are shown in FIG. 12. The transmittance was measured when each display device displays the white color in an on state.

Referring to FIG. 12, the display device of the "Comparative example" exhibited an average transmittance of about 4.86%, and the display device of the "Example" exhibited an average transmittance of about 5.06%. It was found that the transmittance of the display device of the "Example" was improved by about 4% compared to that of the "Comparative example."

According to embodiments, the described liquid crystal composition can improve the transmittance of a display device by reducing the elastic modulus (K11) and the refractive index anisotropy (Δn) of the liquid crystal layer of the display device.

Many variations and modifications can be made to the described example embodiments. The scope of practical embodiments is defined by the claims.

What is claimed is:

1. A liquid crystal composition comprising:
based on 100 parts by weight of the entire liquid crystal composition, respectively,
in a range of 21.5 to 26.5 parts by weight of the liquid crystal composition, a liquid crystal compound represented by Chemical Formula 1;
in a range of 2.5 to 7.5 parts by weight of the liquid crystal composition, a liquid crystal compound represented by Chemical Formula 2;
in a range of 12.5 to 17.5 parts by weight of the liquid crystal composition, a liquid crystal compound represented by Chemical Formula 3;
in a range of 5.5 to 10.5 parts by weight of the liquid crystal composition, a liquid crystal compound represented by Chemical Formula 4;
in a range of 7.5 to 12.5 parts by weight of the liquid crystal composition, a liquid crystal compound represented by Chemical Formula 5;
in a range of 2 to 7 parts by weight of the liquid crystal composition, a liquid crystal compound represented by Chemical Formula 6;
in a range of 10.5 to 15.5 parts by weight of the liquid crystal composition, a liquid crystal compound represented by Chemical Formula 7; and
in a range of 13 to 18 parts by weight of the liquid crystal composition, an liquid crystal compound represented by Chemical Formula 8,

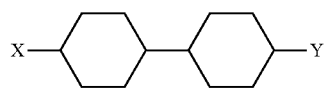

Chemical Formula 1

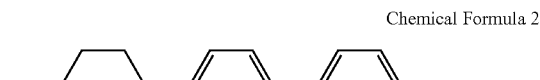

Chemical Formula 2

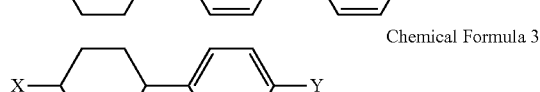

Chemical Formula 3

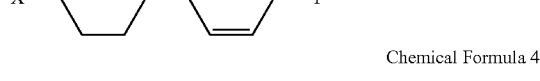

Chemical Formula 4

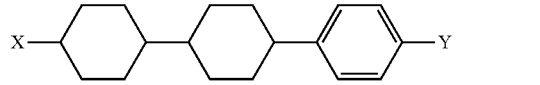

Chemical Formula 5

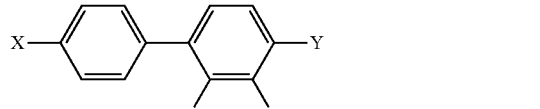

Chemical Formula 6

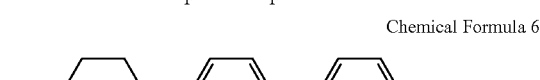

Chemical Formula 7

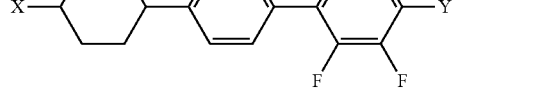

Chemical Formula 8 wherein in Chemical Formulas 1 to 8, X and Y are each independently an alkenyl group or an alkyl group, and wherein a total number of carbon atoms in the alkenyl group is in a range of 2 to 7 and a total number of carbon atoms in the alkyl group is in a range of 1 to 7.

2. The liquid crystal composition of claim 1, wherein the liquid crystal compound represented by Chemical Formula 1 includes a first liquid crystal compound in which X and Y are alkyl groups, and includes a second liquid crystal compound in which X is one of an alkyl group and an alkenyl group and in which Y is the other of the alkyl group and the alkenyl group.

3. The liquid crystal composition of claim 2, wherein the second liquid crystal compound is in a range of 18 to 36 parts by weight based on 100 parts by weight of the entire liquid crystal compound represented by Chemical Formula 1.

4. The liquid crystal composition of claim 1, further comprising:
a compound represented by Chemical Formula 9, Chemical Formula 9

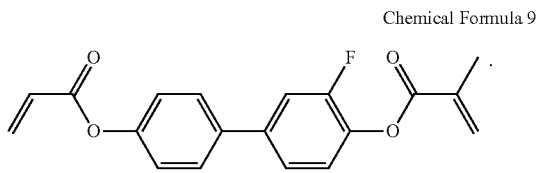 [SMILES: C=CC(=O)Oc1ccc(-c2ccc(OC(=O)C(=C)C)c(F)c2)cc1]

5. The liquid crystal composition of claim 4, wherein the compound represented by Chemical Formula 9 is in a range of 0.2 to 0.5 parts by weight based on 100 parts by weight of the entire liquid crystal composition.

6. The liquid crystal composition of claim 1, wherein the liquid crystal composition has a first elastic modulus (K33) in a range of 15 pN to 18 pN, and satisfies Mathematical Expression 1,
Mathematical Expression 1
$6 \leq$ rotational viscosity ($\gamma 1$)/first elastic modulus (K33)$\leq 7.2$.

7. The liquid crystal composition of claim 6, wherein the liquid crystal composition has a second elastic modulus K11 in a range of 12 pN to 15 pN.

8. The liquid crystal composition of claim 7, wherein the liquid crystal composition has a refractive index anisotropy ($\Delta n$) in a range of 0.100 to 0.104.

9. The liquid crystal composition of claim 8, wherein the liquid crystal composition has a dielectric anisotropy ($\Delta \varepsilon$) in a range of $-2.9$ to $-3.3$.

10. A display device comprising:
a first substrate including a pixel electrode;
a second substrate including a common electrode; and
a liquid crystal layer interposed between the first substrate and the second substrate,
wherein the liquid crystal layer includes the liquid crystal composition according to claim 1.

11. The display device of claim 10, wherein the liquid crystal compound represented by Chemical Formula 1 includes a first liquid crystal compound in which X and Y are alkyl groups, and includes a second liquid crystal compound in which X is one of an alkyl group and an alkenyl group and in which Y is the other of the alkyl group and the alkenyl group.

12. The display device of claim 11, wherein the second liquid crystal compound is in a range of 18 to 36 parts by weight based on 100 parts by weight of the entire liquid crystal compound represented by Chemical Formula 1.

13. The display device of claim 10, wherein the liquid crystal composition further includes a compound represented by Chemical Formula 9, Chemical Formula 9

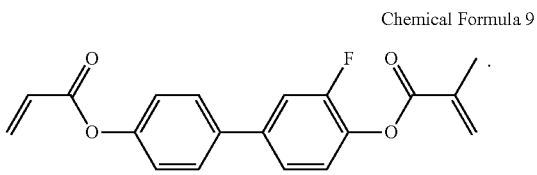 [SMILES: C=CC(=O)Oc1ccc(-c2ccc(OC(=O)C(=C)C)c(F)c2)cc1]

14. The display device of claim 13, wherein the compound represented by Chemical Formula 9 is in a range of 0.2 to 0.5 parts by weight based on 100 parts by weight of the entire liquid crystal composition.

15. The display device of claim 10, wherein the display device has a phase difference in a range of 310 nm to 340 nm.

16. The display device of claim 15, wherein the liquid crystal composition has a first elastic modulus (K33) in a range of 15 pN to 18 pN, and satisfies Mathematical Expression 1,
Mathematical Expression 1
$6 \leq$ rotational viscosity ($\gamma 1$)/first elastic modulus (K33)$\leq 7.2$.

17. The display device of claim 16, wherein the liquid crystal composition has a second elastic modulus (K11) in a range of 12 pN to 15 pN.

18. The display device of claim 16, wherein the liquid crystal composition has a refractive index anisotropy ($\Delta n$) in a range of 0.100 to 0.104.

19. The display device of claim 16, wherein the liquid crystal composition has a dielectric anisotropy ($\Delta \varepsilon$) in a range of $-2.9$ to $-3.3$.

20. The display device of claim 13, wherein the liquid crystal layer includes a liquid crystal aligned to have a pretilt angle according to a polymer network composed of polymers of reactive mesogens represented by Chemical Formula 9.

* * * * *